(12) United States Patent
Seo et al.

(10) Patent No.: US 7,955,564 B2
(45) Date of Patent: Jun. 7, 2011

(54) MICRO REACTOR

(75) Inventors: Jung Hyun Seo, Daegu-si (KR); Jae Hoon Choe, Daejeon-si (KR); Yoo Seok Kim, Daejeon-si (KR); Kwang Ho Song, Sungnam-si (KR)

(73) Assignee: LG Chem, Ltd., Seoul (KR)

( * ) Notice: Subject to any disclaimer, the term of this patent is extended or adjusted under 35 U.S.C. 154(b) by 284 days.

(21) Appl. No.: 12/289,475

(22) Filed: Oct. 28, 2008

(65) Prior Publication Data
US 2009/0142237 A1 Jun. 4, 2009

(30) Foreign Application Priority Data

Oct. 29, 2007 (KR) .................. 10-2007-0109100
Oct. 9, 2008 (KR) .................. 10-2008-0099212

(51) Int. Cl.
*B01J 19/00* (2006.01)
*B01J 10/00* (2006.01)
*B01J 12/00* (2006.01)
*B01J 14/00* (2006.01)

(52) U.S. Cl. .................. 422/130; 422/129; 422/131
(58) Field of Classification Search ........... 422/129–131
See application file for complete search history.

(56) References Cited

U.S. PATENT DOCUMENTS

| 6,409,072 | B1 * | 6/2002 | Breuer et al. | 228/111.5 |
| 7,172,735 | B1 * | 2/2007 | Lowe et al. | 422/188 |
| 2004/0234566 | A1 * | 11/2004 | Qiu et al. | 424/401 |

OTHER PUBLICATIONS

Hessel et al, Micromixers—a review on passive and active mixing principles, 2005, Chemical Engineering Science 60, 2479-2501.*
Yoshida et al, Enhancement of Chemical Selectivity by Microreactors, 2005, Chem. Eng. Technol., 28, No. 3, 259-266.*

* cited by examiner

*Primary Examiner* — Walter D Griffin
*Assistant Examiner* — Natasha Young
(74) *Attorney, Agent, or Firm* — McKenna Long & Aldridge LLP

(57) ABSTRACT

The present invention discloses the substrate and the micro reactor for mixing two kinds of fluids. The micro reactor of the present invention comprises a housing having first and second inlet ports and an outlet port formed thereon; and a plurality of substrates stacked in the housing, wherein the substrate has a space formed at a central portion thereof in one direction; a plurality of first channels extended from one side thereof to the space and corresponding to the first inlet port; and a plurality of second channels extended from the other side thereof to the space and corresponding to the second inlet port; wherein a portion between two neighboring first channels corresponds to the second channel and a portion between two neighboring second channels corresponds to the first channel to form sequentially reaction interfaces of the first and second fluids in the space.

7 Claims, 4 Drawing Sheets

MICRO REACTOR

CROSS-REFERENCE TO RELATED APPLICATIONS

This application claims priorities from Korean Patent Application Nos. 2007-109100 filed on Oct. 29, 2007 and 2008-99212 filed on Oct. 9, 2008, the contents of which are incorporated herein by reference in its entirety.

BACKGROUND OF THE INVENTION

The present invention relates to a substrate and a micro reactor comprising the same, more particularly relates to micro reactor which can mix rapidly fluids through a diffusion phenomenon and can be utilized for mixing effectively a great quantity of fluids with low pressure loss therein and can form interfaces of reaction fluids in the matrix arrangement to increase a mixing efficiency between the fluids.

In general, a micro reactor is provided for carrying out chemical reactions between one reaction partner in fluid form and another reaction partner in liquid form. The micro reactor comprises a substrate on which a plurality of micro channels (having a width of several micrometers to several hundred micrometers) are formed, and a mixing space communicated in fluid with the micro channels is provided in the micro reactor.

In such micro reactor, various kinds of fluids are introduced into the mixing space through the plurality of micro channels, and the fluids are then mixed with each other in the mixing space.

Differences between a mixing/reaction performed in the micro reactor and a conventional batch manner utilizing a flask are as follows.

The more mixed well two kinds of fluids are, the more performed rapidly a chemical reaction between liquid-phase fluids is. In a case where the reaction is carried out in the micro space, fluid is finely dispersed. At this time, an area of interface of reaction fluids is relatively increased so that a mixing of two kinds of fluids is carried out extremely well and the reaction efficiency is enhanced.

In addition, although reactant is not mixed actively, a mixing is performed by a diffusion generated on the interface.

Such micro reactor has the advantage that a mixing can be performed at a high ratio, a temperature can be controlled precisely and a staying time of reactant can be adjusted.

In recent, due to the above advantages, the micro reactor has been studied vigorously, and various methods for increasing the reaction interface have been proposed.

Korean patent laid-open publication No. 2005-0085236 discloses the structure in which channels with various shapes are formed on a plate and a slot plate is coupled to the plate. However, the above structure has the drawback that since the plate should be provided additionally for performing a mixing, the structure is complicated and the reaction efficiency is lowered due to a pressure loss caused by the plate.

SUMMARY OF THE INVENTION

The present invention is conceived to solve the above-mentioned problems of the conventional micro reactor, an object of the present invention is to provide a substrate comprising channels through which reaction fluids are flowed and a mixing portion formed integrally with each other.

Another objective of the present invention is to provide a micro reactor comprising a plurality of substrates for forming interfaces of the reaction fluids in the matrix arrangement for increasing a mixing efficiency.

In order to achieve the above objects, the substrate for mixing two kinds of fluids according to the present invention is characterized in that a space is formed at a central portion thereof in one direction, a plurality of first channels are formed thereon and extended from one side thereof to the space; and a plurality of second channels are formed thereon and extended from the other side thereof to the space, wherein a portion between two neighboring first channels corresponds to the second channel and a portion between two neighboring second channels corresponds to the first channel.

The substrate of the present invention can consist of a first unit substrate on which the first channels are formed and a second unit substrate on which the second channels are formed, the space is formed between the first and second unit substrates.

A micro reactor according to the present invention comprises a housing having first and second inlet ports and an outlet port formed thereon; and a plurality of substrates stacked in the housing, wherein the substrate has a space formed at a central portion thereof in one direction; a plurality of first channels extended from one side thereof to the space and corresponding to the first inlet port; and a plurality of second channels extended from the other side thereof to the space and corresponding to the second inlet port. At this time, a portion between two neighboring first channels corresponds to the second channel and a portion between two neighboring second channels corresponds to the first channel to form interfaces of the first and second reaction fluids in the space.

In the micro reactor, the neighboring substrates have 180 degree rotational symmetric structures with respect to a vertical line passing the centers of the spaces of the substrates to form interfaces of the first fluid and second reaction fluids in the space of the upper substrate.

In the micro reactor, the housing comprises a mounting portion in which the substrates are received, and first and second diffusion portions formed on both sides of the mounting portion, the first and second inlet ports are connected to the first and second diffusion portions, respectively, and each diffusion portion is formed such that a cross-sectional surface area is gradually increased from an outer portion corresponding to the inlet port toward an inner portion corresponding to the mounting portion.

In the micro reactor of the present invention, the substrate can consist of a first unit substrate on which the first channels are formed and a second unit substrate on which the second channels are formed, the space is formed between the first and second unit substrates. At this time, the micro reactor further comprises a spacer for adjusting and maintaining a distance between the first unit substrate and the second unit substrate.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF SPECIFIC EMBODIMENTS

Hereinafter, a substrate and a micro reactor comprising the same according to the preferred embodiments of the present invention will be explained in more detail with reference to the accompanying drawings. However, it should be understood that the embodiment of the present invention can be variously modified, a scope of the present invention is not limited to the embodiment described herein, and the embodiment is provided for explaining more completely the present invention to those skilled in the art.

Figure 1:
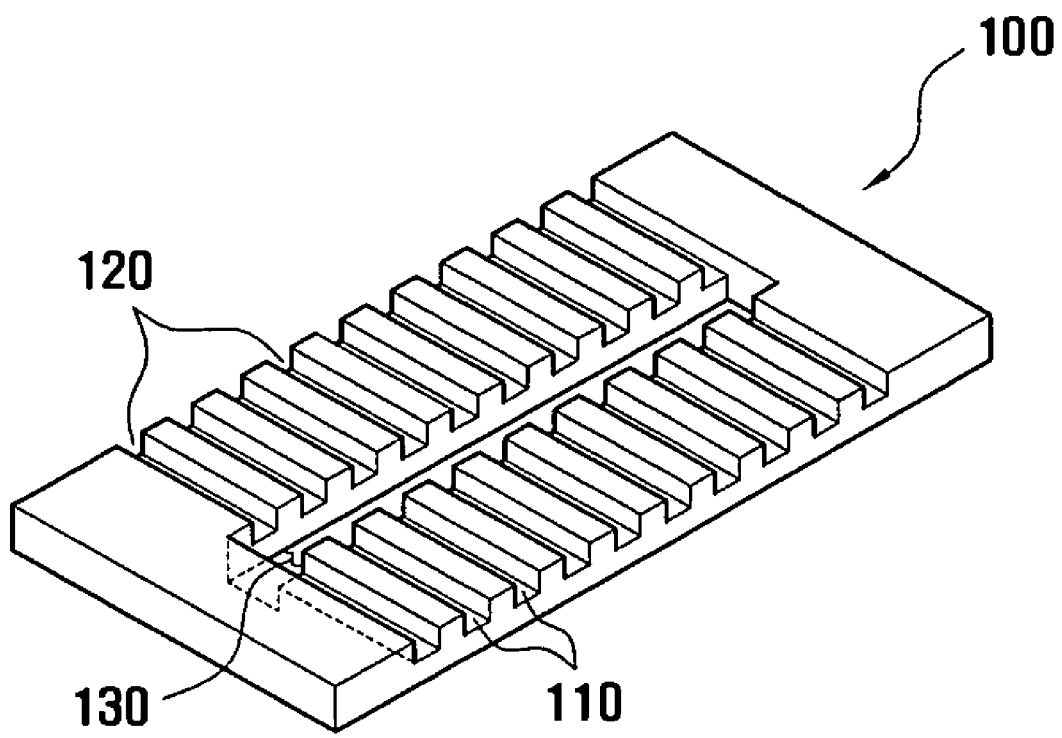
FIG. 1 is a perspective view showing a substrate according to one embodiment of the present invention.
Figure 2:
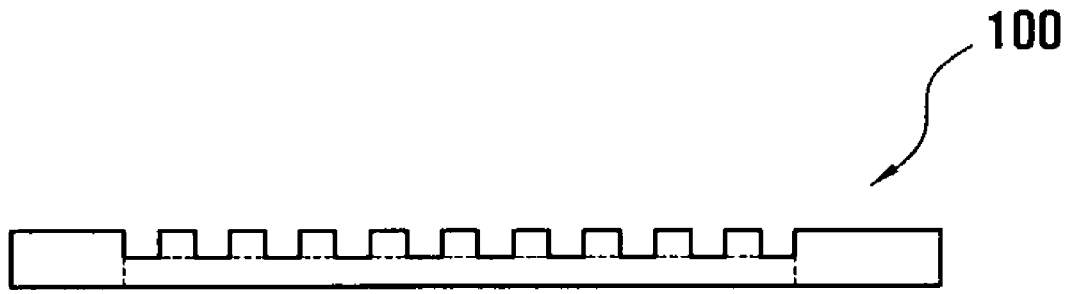
FIG. 2 is a side view of the substrate illustrating in FIG. 1.

FIG. 1 is a perspective view showing a substrate according to one embodiment of the present invention and FIG. 2 is a side view of the substrate illustrating in FIG. 1.

In the present invention, a slot 130 is formed on a substrate 100 in a longitudinal direction of the substrate, a plurality of first channels 110 and a plurality of second channel 120 are formed on both side portions of the slot 130.

Each of the first channels 110 is extended from one side end of the substrate 100 to the slot 130 and a first fluid is flowed in the first channels 110.

Each of the second channels 120 is extended from the other side end of the substrate 100 to the slot 130 and a second fluid is flowed in the second channels 120.

At this time, it is preferable that the first and second channels 110 and 120 are formed such that each second channel 120 corresponds to a portion between the two neighboring first channels 110.

The terms of the first fluid and the second fluid used herein indicate two kinds of fluids to be mixed with each other.

It is preferable that the first and second channels 110 and 120 have a linear shape. The first and second channels 110 and 120 are extinguishable according to the use thereof. In view of a function of the channel, if the channel has the linear shape, the fluid is flowed in the channel at regular linear rate regardless of a location so that the fluids can be mixed uniformly.

In general, the substrate 100 may be made from material having a strong durability and a corrosion resistance. In particular, it is preferable that the substrate is made from stainless steel or hastalloy.

In addition, it is preferable to determine a size of the substrate, a distance between the channels, the number of channels, and a width and depth of the channel on the basis of a treatment capacity.

The substrate according to one embodiment of the present invention may have a dimension of 10 mm×20 mm, and each channel may have a width Of 20 μm to 100 μm, a length (i.e., a distance between one side end and the slot on the substrate) of 3,500 μm to 4,500 μm and a depth of 100 μm to 200 μm. In addition, a distance between the neighboring channels may be 20 μm to 100 μm. At this time it will be apparent that if a width of the channel is increased, a distance between the channels (for example, the second channels) should be adjusted according to a dimension (a width) of the corresponding opposite channel (for example, the first channel).

In addition, it is preferable that the slot 130 formed on a central portion of the substrate has a width of 100-2,000 μm If the slot has a width less than the above range, a high pressure is exerted to the substrate (in other words, a pressure drop is generated). In the contrary, if the slot has a width higher than the above range, the first and second fluids passes through the slot in a state that the first and second fluids are not mixed sufficiently so that the mixing degree of the first and second fluids can be lowered.

Figure 3:
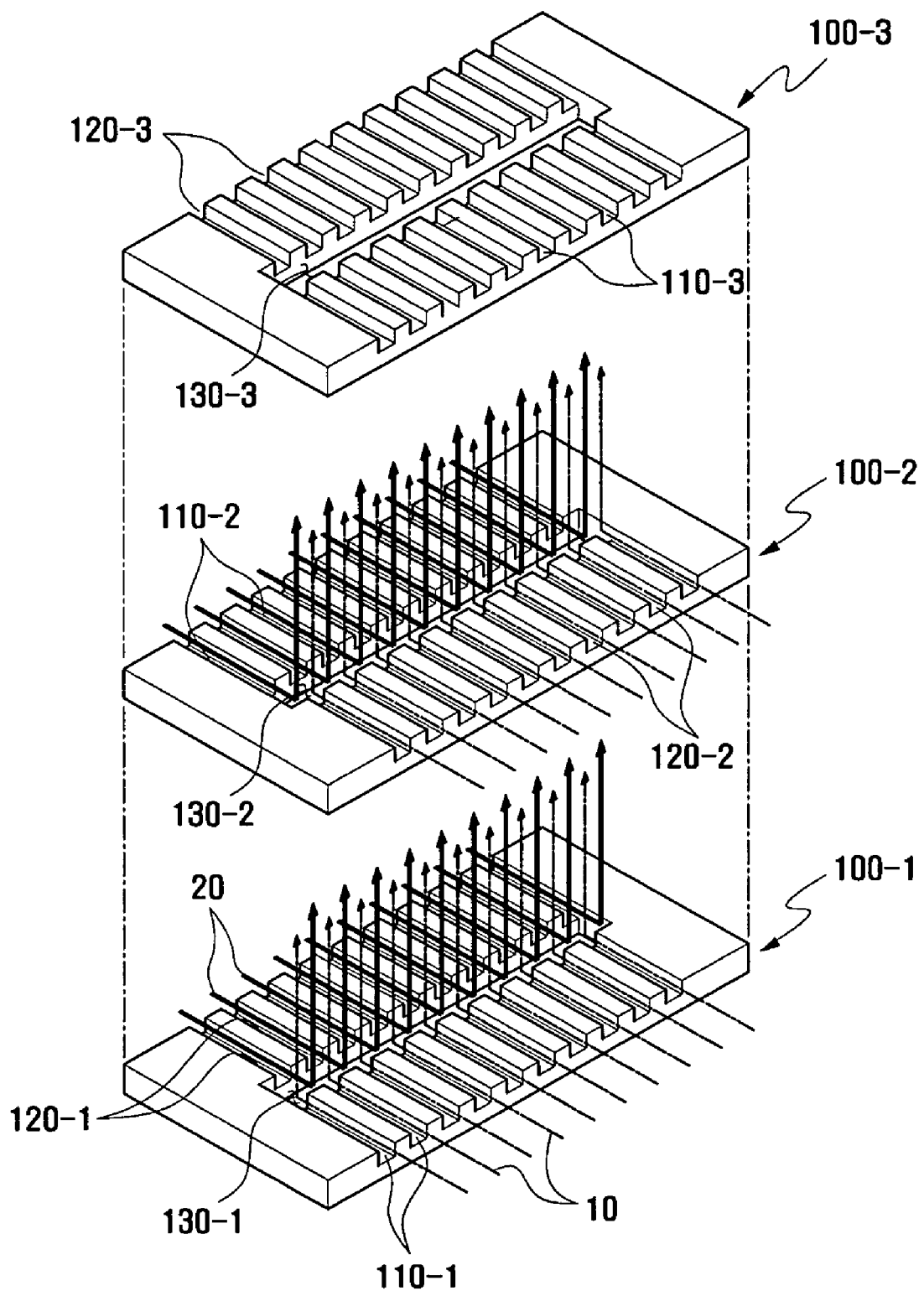
FIG. 3 is a perspective view showing a state where a plurality of substrates according to the present invention are stacked.

FIG. 3 is a perspective view showing a state where a plurality of substrates according to the present invention.

In a micro reactor 300 according to one embodiment of the present invention, a plurality of substrates are stacked, the first and second fluids are introduced into the channels formed on one substrate (for example, the lowermost substrate), and so interfaces of reaction fluids are formed in the slot of the substrate. Then, the fluids pass sequentially through the slots of the substrates placed above the substrate on which the interfaces of reaction are formed.

In one embodiment of the present invention, it is preferable that a flow of the fluid in the channel is perpendicular to a flow of the fluid passing through the slot.

Due to the continuous inflow of the fluids into the channels, an ascent flow of the first and second fluids is formed in the slot formed at a central portion of the substrate.

In the structure in which a plurality of substrates are stacked, at this time, it is preferable that a plurality of substrates are disposed such that one substrate and its neighboring substrate have 180 degree rotational symmetric structures with respect to a vertical line passing the centers of the slots of the substrates in order to increase the number of the interface of reaction.

In a first substrate 100-1 placed at a lower portion, as shown in FIG. 3, first fluid 10 is flowed in first channels 110-1 and second fluid 20 is flowed in second channels 120-1, and a plurality of interfaces of the reaction first and second fluids are formed in a central slot 130-1 in the longitudinal direction of the slot.

In a second substrate 100-2 placed at a mid portion, the first fluid 10 is flowed in second channels 120-2 and the second fluid 20 is flowed in first channels 110-2, and a plurality of interfaces of the first and second reaction fluids are formed in a slot 130-2 of the second substrate 100-2 in the longitudinal direction of the slot.

At this time, since the first substrate 100-1 and the second substrate 100-2 have 180 degree rotational symmetric structures with respect to a vertical line passing the centers of the slots of the substrates 100-1, 100-2, the first fluid passing the slot 130-1 of the first substrate 100-1 and the second fluid passing the first channels 110-2 of the second substrate 100-2 form the interfaces of the first and second reaction fluids in the slot 130-2 of the second substrate 100-2 and then pass the slot 130-2 of the second substrate 100-2.

In addition, a third substrate 100-3 and the second substrate 100-2 have 180 degree rotational symmetric structures with respect to a vertical line passing the centers of the slots of the substrates, the interfaces of the first and second reaction fluid are formed in a slot 130-3 of the third substrate 100-3.

Figure 4:
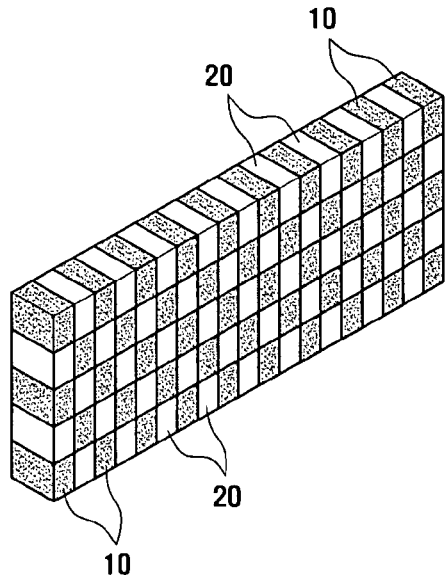
FIG. 4 is a conceptual view showing interfaces of reaction fluids formed in slots of stacked substrates shown in FIG. 3.

FIG. 4 is a conceptual view showing interfaces of the first and second reaction fluids 10 and 20 in the slots of the stacked substrates shown in FIG. 3. For convenience's sake, in FIG. 4, the first fluids 10 are illustrated as the dotted blocks and the second fluids 20 are illustrated as the blank blocks.

As shown in FIG. 4, the first fluid 10 passing through the slot of one substrate corresponds to the second fluid 20 in the slots of the neighboring substrates. Accordingly, it will be apparent that the number of the interfaces of the first and second reaction fluids 10 and 20 can be maximized.

In other words, since the interfaces of the reaction fluids 10, 20 are formed in the matrix arrangement along the longitudinal direction of the slot as well as the height wise direction of the substrates, the mixing efficiency can be increased in proportion to the number of the interfaces of the reaction fluids.

Figure 5:
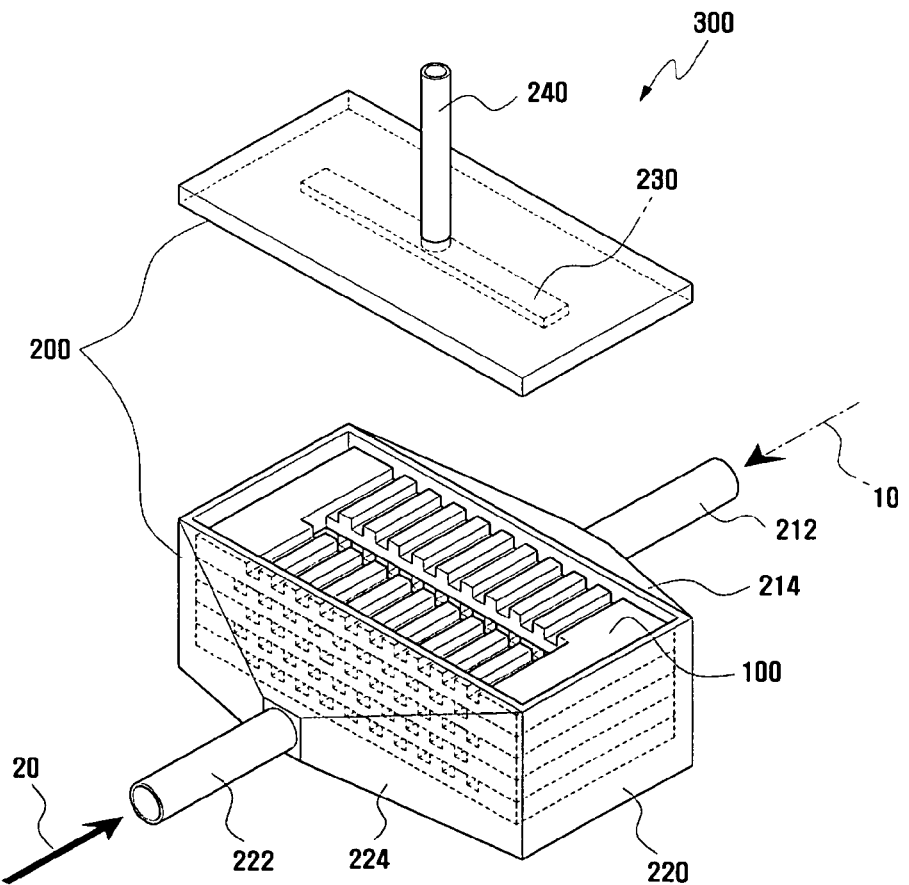
FIG. 5 is a schematic perspective view of a micro reactor according to one embodiment of the present invention.

FIG. 5 is a schematic perspective view of a micro reactor according to one embodiment of the present invention. In the micro reactor 300 shown in FIG. 5, a plurality of substrates 100 are stacked in a housing 200.

The housing 200 comprises a mounting portion 220 in which the substrates 100 are received, first and second diffusion portions 214 and 224 formed on both sides of the mounting portion 220 and first and second inlet ports 212 and 222 connected to the first and second diffusion portions 214 and 224, respectively.

The mounting portion 220, the first and second diffusion portions 214 and 224 and the first and second inlet ports 212 and 222 are communicated in fluid with each other, so the fluids 10 and 20 introduced into the first and second inlet ports 212 and 222 are flowed to a plurality of substrates 100 stacked in the mounting portion 220 via the first and second diffusion portions 214 and 224, respectively.

In other words, the first fluid 10 is introduced into the first inlet port 212 and then flowed into the channels of the stacked substrates 100 via the first diffusion portion 214. Also, the second fluid 20 is introduced into the second inlet port 222 and then flowed into the channels of the stacked substrates 100 via the second diffusion portion 224.

Here, it is preferable that each of the first and second diffusion portions 214 and 224 is formed such that a cross-sectional surface area is gradually increased from an outer portion corresponding to the inlet port toward an inner portion corresponding to the mounting portion 220.

At this time, as shown in FIG. 3, the fluids are introduced into the first and second channels of each of the substrates stacked in the mounting portion 220 of the housing 200, interfaces of the first and second reaction fluids are formed in the slot of each substrate. Subsequent, the first and second fluids pass sequentially the slots of the substrates placed above and then discharged to an outside through an outlet port 240 formed on an upper member of the housing 200.

As shown in FIG. 3, the first and second fluids passed the slot of the first substrate (for example, the lowermost substrate 100-1 in FIG. 3) correspond to the second and first fluids passed the first and second channels of the second substrate (100-2 placed on the first substrate 100-1 in FIG. 3), so that the interfaces of the first and second reactant fluids flowed from the first substrate 100-1 and the channels of the second substrate 100-1 are formed in the slot of the second substrate.

Subsequent, the above phenomenon is generated in the third substrate (for example, the uppermost substrate 100-3 in FIG. 3), and the first and second fluids pass sequentially the slot of the third substrate are then discharged to an outside through an outlet port 240 formed on an upper member of the housing 200.

At this time, a groove 230 can be formed on a lower portion of the upper member on which the outlet port 240 is formed, and the groove 230 is communicated in fluid with the outlet port 240 and corresponds to the slots of the substrates stacked in the housing 200. Accordingly, the first ands second fluids 10 and 20 discharged from the slot of the uppermost plate (100-3 in FIG. 3) are flowed into the groove 230 and then exhausted to an outside via the outlet port 240.

Figure 6:
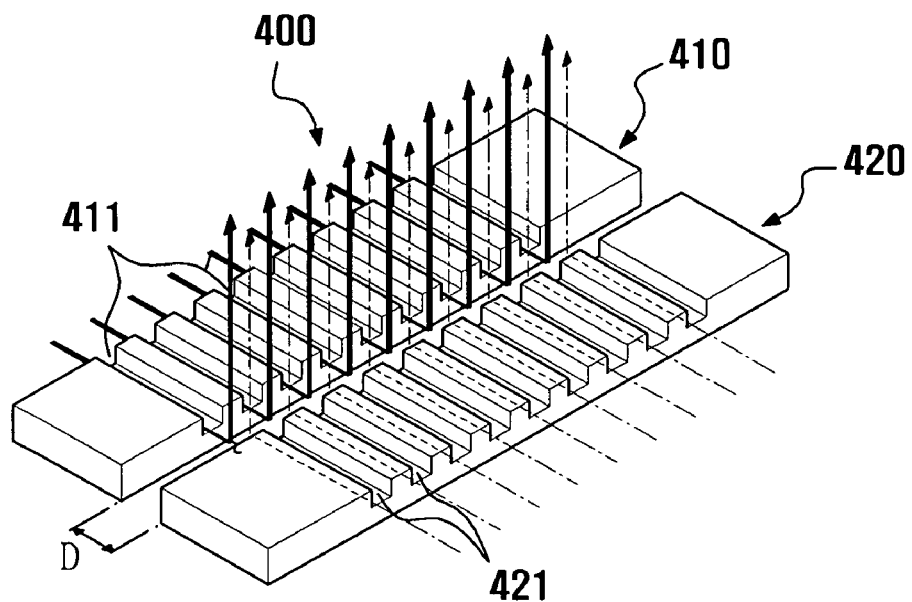
FIG. 6 is a perspective view showing a substrate according to another embodiment of the present invention.
Figure 7:
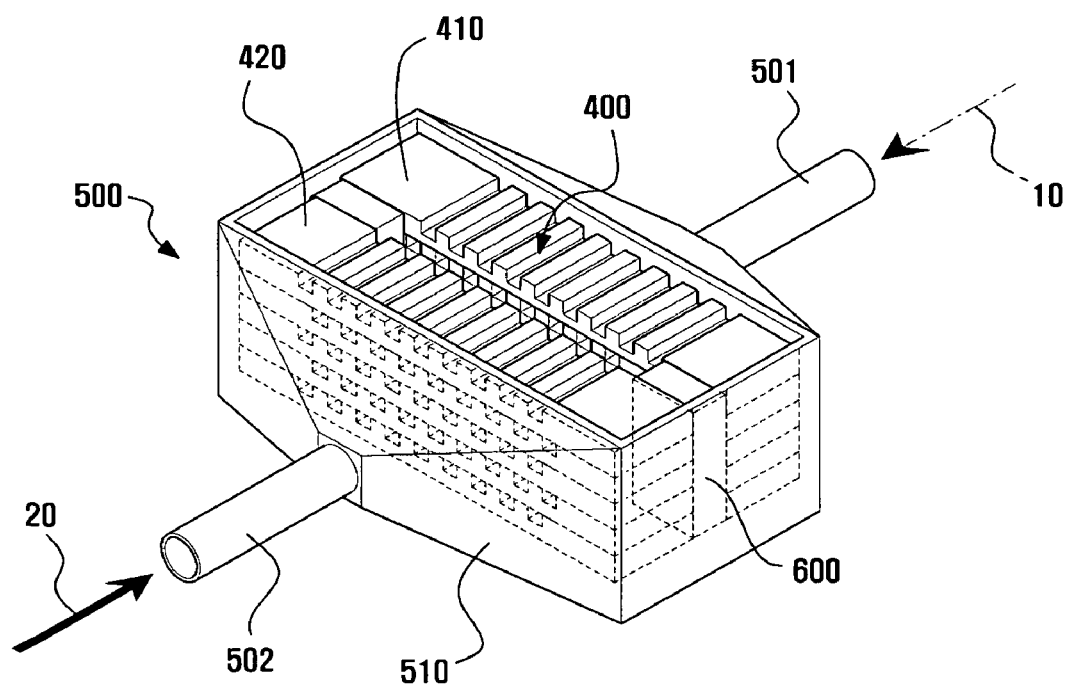
FIG. 7 is a schematic perspective view of a micro reactor according to another embodiment of the present invention.

FIG. 6 is a perspective view showing a substrate according to another embodiment of the present invention, and FIG. 7 is a schematic perspective view of a micro reactor according to another embodiment of the present invention.

Referring to FIG. 6, a substrate 400 according to another embodiment of the present invention comprises first and second unit substrates 410 and 420 spaced from each other at a certain interval D, and a plurality of channels 411 and 421 are formed on the first and second unit substrates 410 and 420, respectively.

Each channel 411 of the first unit substrate 410 corresponds to a portion between two neighboring channels 421 of the second unit substrate 420, and each channel 421 of the second unit substrate 420 corresponds to a portion between two neighboring channels 411 of the first unit substrate 410.

Here, a space between the first and second unit substrates 410 and 420 acts as the slot 130 of the substrate 100 shown in FIG. 1

In the substrate 100 shown in FIG. 1 and FIG. 3, the slot 130 is formed on each substrate 100 and the slot 130 acts as a space in which the first fluid is mixed with the second fluid. In the substrate 400 shown in FIG. 6, however, the space between the first and second unit substrates 410 and 420 acts as a space in which the first fluid is mixed with the second fluid.

Here, a material used for manufacturing the substrate 400 may be the same as that used for manufacturing the substrate 100 shown in FIG. 1 and FIG. 3, and a width between the channels of each of the unit substrates 410 and 420 of the substrate 400 may be the same as that between the channels formed on the substrate 100 shown in FIG. 1 and FIG. 3.

On the other hand, it is preferable that the distance D between the first and second unit substrates 410 and 420 of the substrate 400 is 100 μm to 2,000 μm, and this distance D corresponds to a width of the slot 130 of the substrate 100 shown in FIG. 1 and FIG. 3.

A function of the substrate 400 is the same as that of the substrate 100 shown in FIG. 1, so the detail description thereon is omitted.

Referring to FIG. 6 and FIG. 7, a micro reactor 500 according to another embodiment of the present invention comprises a plurality of substrates 400 shown in FIG. 6. In other words, the micro reactor 500 comprises a housing 510 on which first and second inlet ports 501 and 502 and an outlet port (not shown) are formed and a plurality of substrates 400 accommodated in the housing 510.

Here, the micro reactor 500 may further comprise a means disposed in the housing 500 to maintain an interval D between the first and second unit substrates 410 and 420 of the substrate 400.

Spacers 600 may be employed as the interval-maintaining means, and each spacer 600 is disposed between end portions of the first and second unit substrates 410 and 420 of the substrate 400.

In a case where the spacers 600 are utilized for maintaining the interval between the first and second unit substrates 410 and 420 of the substrate 400, recesses (not shown) may be formed on a bottom surface of the housing 500 to secure the spacers 600. The spacers 600 are mounted in the recesses to enable the first and second unit substrates 410 and 420 of the substrates 400 to be disposed at a certain interval.

In the micro reactor 500 constructed as above, the first fluid 10 passing sequentially the first inlet port 501 and the channels of the first unit substrates 410 of the substrates 400 and the second fluid 20 passing sequentially the second inlet port 502 and the channels of the second unit substrates 420 of the substrates 400 form sequentially the interfaces in the space formed between the first unit substrates 410 and second unit substrates 420.

A function of the micro reactor 500 is the same as that of the micro reactor 300 shown in FIG. 5, so the detail description thereon is omitted.

As described above, the substrate according to the present invention and the micro reactor comprising the same can form maximumly the interfaces of the reaction fluids in the matrix arrangement in the limited space to increase a mixing efficiency between the fluids. In particular, the present invention can utilize for mixing a great quantity of fluids with low pressure loss therein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A micro reactor, comprising;
   a housing having first and second inlet ports and an outlet port formed thereon; and
   a plurality of substrates stacked in the housing,
   wherein the substrate has a space formed at a central portion thereof in one direction; a plurality of first channels extended from one side thereof to the space and corresponding to the first inlet port; and a plurality of second channels extended from the other side thereof to the space and corresponding to the second inlet port; wherein a portion between two neighboring first channels corresponds to the second channel and a portion between two neighboring second channels corresponds to the first channel to form sequentially reaction interfaces of the first and second fluids in the space,
   wherein the substrate consists of a first unit substrate on which the first channels are formed and a second unit substrate on which the second channels are formed, the space is formed between the first and second unit substrate.

2. The micro reactor of claim 1, wherein the neighboring substrates have 180degree rotational symmetric structures with respect to a vertical line passing the centers of the spaces of the substrates to form interfaces of the first and second reaction fluids in the slot of the upper substrate.

3. The micro reactor of claim 1, wherein a flow of fluid in the channel of the substrate is perpendicular to that of fluid in the space of the substrate.

4. The micro reactor of claim 1, wherein the housing comprises a mounting portion in which the substrates are received, and first and second diffusion portions formed on both sides of the mounting portion, the first and second inlet ports are connected to the first and second diffusion portions, respectively, and each diffusion portion is formed such that a cross-sectional surface area is gradually increased from an outer portion corresponding to the inlet port toward an inner portion corresponding to the mounting portion.

5. The micro reactor of claim 1, wherein the space is a slot formed on the substrate.

6. The micro reactor of claim 1, wherein the space has a width of 100 to 2,000 μm.

7. The micro reactor of claim 1, further comprising a spacer for adjusting and maintaining a distance between the first unit substrate and the second unit substrate.

* * * * *